United States Patent
Hammes (10) Patent No.: US 12,349,060 B2
(45) Date of Patent: *Jul. 1, 2025

(54) SAFETY SYSTEM AND METHOD USING A SAFETY SYSTEM

(71) Applicant: SICK AG, Waldkirch (DE)

(72) Inventor: Markus Hammes, Waldkirch (DE)

(73) Assignee: SICK AG, Waldkirch (DE)

( * ) Notice: Subject to any disclaimer, the term of this patent is extended or adjusted under 35 U.S.C. 154(b) by 389 days.

This patent is subject to a terminal disclaimer.

(21) Appl. No.: 17/879,286

(22) Filed: Aug. 2, 2022

(65) Prior Publication Data

US 2023/0037937 A1 Feb. 9, 2023

(51) Int. Cl.
| | | |
|---|---|---|
| G08B 21/02 | (2006.01) | |
| G01S 13/86 | (2006.01) | |
| H04W 52/02 | (2009.01) | |

(52) U.S. Cl.
CPC ......... *H04W 52/0203* (2013.01); *G01S 13/86* (2013.01); *G08B 21/02* (2013.01)

(58) Field of Classification Search
CPC ..... H04W 52/0203; H04W 4/70; G01S 13/86; G01S 13/765; G01S 13/862; G01S 13/865; G01S 13/87; G01S 5/0205; G01S 2205/01; G08B 21/02; G08B 13/1636; G08B 13/181; G08B 21/22
See application file for complete search history.

(56) References Cited

U.S. PATENT DOCUMENTS

| | | | | |
|---|---|---|---|---|
| 2004/0038677 | A1* | 2/2004 | Avery | G01S 5/14 455/446 |
| 2006/0290790 | A1* | 12/2006 | Takaiwa | H04N 1/00925 348/231.99 |
| 2009/0270065 | A1* | 10/2009 | Hamada | G08B 7/066 455/404.1 |
| 2010/0200312 | A1* | 8/2010 | Takenaka | B25J 9/0009 180/8.6 |

(Continued)

FOREIGN PATENT DOCUMENTS

| | | |
|---|---|---|
| DE | 102013202100 A1 | 8/2014 |
| DE | 202016101441 U1 | 6/2017 |

(Continued)

*Primary Examiner* — Charles Cai
(74) *Attorney, Agent, or Firm* — Nath, Goldberg & Meyer; Jerald L. Meyer (57) ABSTRACT

A safety system for the localization of at least one spatially variable object having at least one control and evaluation unit, having at least one radio location system, having at least one spatially resolving sensor for the detection of an object in a detection zone of the spatially resolving sensor, wherein the radio location system has at least three arranged radio stations, wherein at least one radio transponder is arranged at the object, wherein position data of the radio transponder and thus position data of the object can be determined by means of the radio location system, wherein the position data can be transmitted from the radio station of the radio location system to the control and evaluation unit, wherein the control and evaluation unit is configured to cyclically detect the position data of the radio transponder (Continued)

and information on the object in the detection zone can be determined by means of the spatially resolving sensor.

16 Claims, 3 Drawing Sheets

(56) References Cited

U.S. PATENT DOCUMENTS

| | | | |
|---|---|---|---|
| 2015/0049911 A1* | 2/2015 | Doettling | G08B 21/22 382/103 |
| 2019/0212433 A1* | 7/2019 | Horst | G06K 19/0702 |
| 2020/0096599 A1 | 3/2020 | Hewett et al. | |
| 2021/0004606 A1 | 1/2021 | Se et al. | |
| 2023/0062514 A1* | 3/2023 | Hladik | G01S 5/0244 |

FOREIGN PATENT DOCUMENTS

| | | |
|---|---|---|
| DE | 202016105595 U1 | 1/2018 |
| DE | 102020101482 B3 | 4/2021 |
| DE | 202020100454 U1 | 4/2021 |
| EP | 3855208 A1 | 7/2021 |

* cited by examiner

SAFETY SYSTEM AND METHOD USING A SAFETY SYSTEM

The present invention relates to a safety system and to a method using a safety system.

In the present case it is a question of the securing of the automation procedure in factories and logistics sectors. There is a stable trend toward progressive automation and networking of the production and logistic procedure. The background is the large optimization efforts with respect to productivity. Safety engineering is also looked at in this connection. In addition to the primary securing work, it should additionally cause as few restrictions as possible for the productive processes and in the best case it should even promote productivity by the provision of sensor information. Situation-related securing strategies are therefore required in which interventions in the productive processes are avoided wherever possible and, if they are unavoidable, should remain with as few effects on the productive procedure as possible. The safety mechanisms should specifically only become active when persons are in the vicinity of hazard sites and only if a hazard is conceivable and obvious. In addition, staggered securing steps are used in which forward-looking measures are first initiated to avoid an encounter of men and machine completely where possible, e.g. by a warning to a person in the operating environment that a vehicle is approaching and the information or the request that the person takes a different path or waits a moment. An action should only be taken on the machines and productive processes in further escalation stages, for example by a slowing down or an emergency stop of a hazardous movement.

Securing concepts for hazard sites currently dominate that are divided into small steps with local, usually optical safety sensors. Every hazard site is here secured in isolation per se by a locally attached safety sensor. Such sensors are, for example, safety light grids or safety laser scanners.

The emergence of safe localization systems is additionally becoming apparent that enable a higher ranking securing by position determinations of persons and mobile machines. Higher ranking in this case means that the safety relevant information and the safety decision derived therefrom are not generated locally at the hazard site, but that in this case a central RTLS server that is generally not located close to the hazard site or sites takes over this work and can also provide this information to a higher ranking ERP system or process control system. To implement the risk reduction, the central RTLS server has to be able to output safety relevant signals to the hazard points/local machines and can thus act on the hazard procedure.

Optical sensors for local securing of individual hazard sites only have short ranges. This substantially restricts essential productive parameters of machines such as the travel speed of autonomous vehicles. In addition, a short range also means a very short pre-warning time for the control so that generally only the emergency stop of the machine remains as a risk-avoiding measure. This has very disadvantageous effects on the productive procedure.

The local sensors furthermore generally generate very high value information on their direct environment, for example 3D images, object tracking data, detection of the time procedure, etc. that, however, are not available or are only insufficiently available (e.g. not safely in the sense of machine safety) to a higher ranking system due to a lack of a connection to central node points. Other relevant information such as classification information is completely lacking in optical sensor information or can only be extracted with great difficulty.

Safe localization systems provide complementary information on the optical sensors. The information content is, however, restricted to position information and classification information. High resolution environmental information is not available here. In addition, the latency times of the information obtaining is somewhat greater than with optical sensors and the precision of the position information is much smaller.

It is an object of the invention to provide an improved safety system for localization.

The object is satisfied by a safety system for localizing at least one spatially variable object having at least one control and evaluation unit, having at least one radio location system, having at least one spatially resolving sensor for the detection of at least one object in a detection zone of the spatially resolving sensor, wherein the radio location system has at least three arranged radio stations, wherein at least one radio transponder is arranged at the object, wherein position data of the radio transponder and thus position data of the object can be determined by means of the radio location system, wherein the position data can be transmitted from the radio station of the radio location system to the control and evaluation unit, wherein the control and evaluation unit is configured to cyclically detect the position data of the radio transponder and information on the object in the detection zone can be determined by means of the spatially resolving sensor, wherein the information on the object in the detection zone can be transmitted from the spatially resolving sensor to the control and evaluation unit, wherein the control and evaluation unit is configured to evaluate the position data of the radio location system and the information of the spatially resolving sensor, wherein bidirectional radio communication is provided between the radio stations and the radio transponders, and wherein the radio transponders each have safe signal outputs and the radio transponders each have safe signal inputs.

The object is further satisfied by a method using a safety system for localizing at least one spatially variable object, having at least one control and evaluation unit, having at least one radio location system, having at least one spatially resolving sensor for the detection of at least one object in a detection zone of the spatially resolving sensor, wherein the radio location system has at least three arranged radio stations, wherein at least one radio transponder is arranged at the object, wherein position data of the radio transponder and thus position data of the object are determined by means of the radio location system, wherein the position data are transmitted from the radio station of the radio location system to the control and evaluation unit, wherein the control and evaluation unit cyclically detects the position data of the radio transponder and information on the object in the detection zone is determined by means of the spatially resolving sensor, wherein the information on the object in the detection zone is transmitted from the spatially resolving sensor to the control and evaluation unit, wherein the control and evaluation unit evaluates the position data of the radio location system and the information of the spatially resolving sensor, wherein bidirectional radio communication is provided between the radio stations and the radio transponders, and wherein the radio transponders each have safe signal outputs and the radio transponders each have safe signal inputs.

In accordance with the invention, a solution is provided by means of which the available information or sensor information of the spatially resolving sensors in the detection zone, e.g. a protected field, is collected and is merged at a central point, that is the control and evaluation unit or a central safety device or a so-called safety information hub. The merging of local spatially resolving sensor information with the higher ranking position information can be carried out by this safety system and can be used as an information basis for expanded safety functions or diagnostic mechanisms.

This solution or the safety system should make a vertical integration possible, i.e. the linking of sensor data from the direct production and logistics environment, also called "shop floor", with higher ranking control systems or with a higher ranking control and evaluation unit, that monitors and coordinates the processes in factories and logistics facilities.

This integration is an important component of so-called operator models in which a supplier or vendor is not only active on the market in the form of a components supplier, but rather offers the customer the service "securing a factory".

The connection of local spatially resolving sensor information and higher ranking position and process information additionally has the possibility of being able to offer safety functions that cannot be covered by individual local spatially resolving sensors.

A link to a cloud based decentralized server solution with additional background functions or with the additional added value by data evaluation can be offered with the vertical integration of safety information.

It is now an essential feature of the safety system that the radio transponders are additionally put into a position by expanded radio communication, specifically the bidirectional radio communication with the radio stations, to forward information and/or safety relevant information of the object, for example a vehicle and in particular connected local spatially resolving sensors, to the central control and evaluation unit or to an RTSL server. For this purpose, the radio transponder is not only integrated on the object, for example on the vehicle, in the shutdown path of the vehicle, for example via a safety controller, but the radio transponder rather additionally has at least one safe input by which the radio transponder receives output information of the spatially resolving sensor.

The output information can in the simplest case be the safety status of protected fields, for example. In a further expansion stage, however, safe object lists, object positions, and optionally further compressed environmental information.

The object can, for example, be a vehicle, an autonomous vehicle, a machine, a robot, a system part or machine part, or, for example, however, also a person. A localization and tracking of the objects takes place in the detection zone, for example.

The radio transponder outputs the safe output signal, in particular, for example, to the vehicle, to a machine or to the object, via the safe signal output or via a safety interface. The vehicle is, for example, thereupon braked, slowed, or even stopped. A machine can, for example, thereupon be slowed or likewise stopped.

An output of safety related signals to the object, the vehicle, and/or the machine takes place via the safe signal outputs or via the safety interface.

The radio transponder having the safe switching output in particular allows the direct action on the object, the vehicle, or the machine and bypasses the necessity of initiating risk reduction measures via a higher ranking machine control.

The radio transponders are thus additionally equipped with a safe signal output to the machine controller and indirectly to the spatially resolving safety sensor in addition to the primary localization function, namely the transmission of regular brief radio signals to fixed position radio stations. In this way, a safe communication channel can be established between the spatially resolving sensors or local securing sensors and the radio location system or central localization system and further safety functions can be implemented at a central site. In this case, the central safety function can, for example, be a safe standby function for the spatially resolving sensors.

Expanded safety functions that would not be individually accessible to the system components should, for example, be provided via the information merged at the control and evaluation unit or at the safety information hub.

High quality information and/or safety related information can be generated by a combination of the spatially resolving sensor data, for example local securing sensors or environmental sensors with those of a higher ranking radio location system or localization system using the safety system described here. The information is enhanced in that it is first provided at a common higher ranking node point, that is the control and evaluation unit, and second brings together different modalities such as the information of local spatially resolving securing sensors, process information of automation procedures, and the information of the higher ranking radio location system or localization system.

On the one hand, new safety functions can be implemented with this enhanced information, but it can furthermore be forwarded to a decentralized database (data cloud) or local databases for data evaluation or data generation.

Productivity-maintaining securing concepts in which the temporal lead time is used up to the occurrence of a hazard to warn a person at risk in a first step and to take initiate risk-reducing measures can be implemented using such a combined safe information basis. In a second step, an action can be minimally invasively applied to the machines to limit the productivity restrictions. And an emergency stop is only initiated in a last risk reduction step that only becomes necessary if the preceding measures remain without effect.

A much more targeted possibility of an action on objects, e.g. vehicles, machines, or system parts, is above all opened up with this vertical integration of the safety procedure of a whole system or factory.

The radio stations serve the radio-based communication and the time of flight measurement with the spatially variable radio transponders and for forwarding a communication and time of flight measured values to the control and evaluation unit or to the RTLS server.

The control and evaluation unit or a central RTLS server receives the measured signal times of flight and determines position values of the radio transponders present therefrom.

The localization of the radio transponders takes place by time of flight measurements of radio signals that are cyclically exchanged between the radio transponders and a plurality of fixed position radio stations. This triangulation works very well when the signals are transmitted at a sufficient signal strength and on a straight or direct propagation path.

The signals of a radio transponder are received by a plurality of fixed position radio stations or anchor stations and the basis for the localization is created via a time of flight measurement, e.g. the time of arrival (TOA) or e.g. the time difference of arrival (TDOA). The calculation or estimation of the position of a radio transponder then takes place on the control and evaluation unit, for example an RTLS (real time location system) server that is connected to all the radio stations or anchor stations via a wireless or wired data link. This mode of localization is called an RTLS (real time location system) mode.

In a further development of the invention, the control and evaluation unit is configured to compare the position data of the radio location system and the information of the spatially resolving sensor and, on an agreement, to permit the object having the radio transponder in a protected field of the spatially resolving sensor and not to output any object determination signal, whereby a movable machine is in an active state.

A dynamic muting is thus implemented by the safety system. The primary securing function of objects, for example vehicles or machines, is effected by the local spatially resolving securing sensors. Since they are, however, associated with restrictions of the functional extent, the vehicles are, for example, limited in their speed by protected field ranges, the safe localization information of the radio location system can be used for the temporary canceling of the local spatially resolving securing function, that is to initiate muting of the spatially resolving sensor if there is no person in the vicinity of the vehicle. In this case, for example, the vehicle speed can be increased in a targeted manner, optionally with an additional securing with the aid of further reaching warning fields of the spatially resolving sensor or, for example, a robot speed can be increased.

If the position of an object or of a person was able to be detected with the required safety engineering reliability in the protected field, the classical safe function is muted and a machine control can optionally make use of the position data of the object or person for the situation based safeguarding of the machine.

In accordance with the further development, the spatially resolving sensor that is used in a, for example, stationary manner to secure the machine or the actuator, additionally provides its measured data to enable a positioning of the person or of the object in the protected field. In this way, on the presence of the position data of the radio location system and the information, for example status information of a protected field of the spatially resolving sensor, a validation of the position of the person or of the object is made possible and thus accessible to a safety engineering use of the position information.

In addition to this redundant and diverse sensor structure, the error case must also be checked for the safe engineering usability that the position data of the radio location system are lacking or the information of the spatially resolving sensor does not agree with the position data of the radio location system.

In accordance with the present further development, a validation dependent muting of the safety function of the primary safety function, that e.g. is the protected field monitoring, is therefore provided by the spatially resolving sensor, according to which on an agreement of the position information of the spatially resolving sensor and position information of the radio location system, the person or the object having the radio transponder is to be permitted in a protected field of the spatially resolving sensor and no object detection signal is to be output, whereby the actuator is in an active state.

It is decisive in this process that the primary safety function remains muted for so long as the validation of the position data of the radio location system and the information, e.g. status information of the spatially resolving sensor, is successful.

This validation is carried out by the control and evaluation unit. The control and evaluation unit is optionally a functionally safe control and evaluation unit. The control and evaluation unit has means for error localization, for example. These means are, for example, means for testing, for example a redundant and/or diverse structure having two channels for a mutual check of the determined results and the position data.

In a further development of the invention, when an object is detected by the radio location system, the control and evaluation unit is configured to set the spatially resolving sensor into unrestricted operation with a non-reduced detection capability and, if no object has been determined by the radio location system, the control and evaluation unit is configured to set the spatially resolving sensor into restricted operation with a reduced detection capability.

A safe standby function or a safe rest function is thus implemented. This function has the purpose of reducing the energy consumption of the spatially resolving sensor and utilizes localization information of the radio location system to set local safety sensors into an energy saving standby mode at times.

The further development relates to a combination of a higher ranking radio location system or of the safe localization system and of said spatially resolving sensor or decentralized securing sensors with the purpose only to activate them when the radio location system or the localization system registers the approach of a person or of an object.

The further development assumes that in a production plant or a logistics center, the radio location system or safe localization system has been additionally installed beside the locally attached spatially resolving sensors or safety sensors, the positions of the persons, objects, or mobile machines present are determined with an accuracy of around one meter or more exactly. For this purpose, all the persons, objects, and/or, for example, mobile machines are provided with at least one radio transponder.

The safe localization system determines and tracks the locations of all the persons or objects in the detection environment The detection environment can also synonymously be called a monitored zone. It, for example, causes the spatially resolving sensors that are located in the closer environment of persons or objects to "wake up" from a standby operation and, for example, to monitor its environment, for example with a high or higher frequency and a shorter or short response time. Spatially resolving sensors that are not located in the closer environment of persons or object are, for example, caused to switch to the standby operation.

The protected field of the spatially resolving sensor is here preferably located within the detection environment or monitored zone of the radio location system.

This means that the monitored zone of the radio location system is preferably greater or has a greater extent than the protected field of the spatially resolving sensor. If a person and/or an object is/are determined in the detection environment by the radio location system, the control and evaluation unit is configured to set the spatially resolving sensor that is arranged within the detection environment of the radio location system into unrestricted operation with a non-reduced detection capability and, if no person and/or no object is/are determined in the detection environment by the radio location system, the control and evaluation unit is configured to set the spatially resolving sensor that is arranged within the detection environment of the radio location system into restricted operation with a reduced detection capability. The detection environment and/or the protected field can be dynamically adapted.

The signals for the status change are transmitted, for example, from the safe radio location system by the control and evaluation unit or by a central RTLS server via the radio stations or anchor stations to the radio transponders. They conduct the signal, for example, via a safe interface either via the diversion of a safety controller at, for example, a vehicle or a machine onward to the spatially resolving sensor or in a direct path.

In accordance with the present invention, the radio transponder can directly carry out a shutdown of an object, for example a mobile object, a mobile vehicle, and/or a machine. The spatially resolving sensors with their high quality data basis can furthermore satisfy further functions such as navigation, object recognition, or similar and represent a sensible complement to the radio location system due to its complementarity.

It is, however, equally possible to carry out an attention control for the spatially resolving sensors or a dynamic functional switchover on the basis of the combined detection data by spatially resolving sensors and the radio location system. If, for example, no person is present in the proximity to a monitored zone, an object can have a higher speed or can travel or a use of warning fields instead of protected fields can take place with the spatially resolving sensors.

Equally, the mechanism described here can be used as a fallback option for the failure of the higher ranking radio location system. In this case, with a problem-free function of the radio location system, a standby signal was cyclically transmitted to the local spatially resolving sensors. The local spatially resolving sensors are only reactivated or "woken" and take over the safety function when a defect occurs.

A closing down of the total system on the occurrence of a defect in the radio location system can be avoided with this staggered function, initially over a large area by means of the radio location system and then as required or in the defect case with local spatially resolving sensors.

A further measure is, for example, a targeted engagement of spatially resolving sensors to increase the redundancy, diversity, or accuracy of detection work in special situations. If a safety level of the radio location system corresponds, for example, to a middle level, but the risk avoidance in the direct proximity of persons requires a higher level, the reliability can be further increased by engaging spatially resolving sensors.

In a further development, when an object is detected by the radio location system, the control and evaluation unit is configured to set the spatially resolving sensor into unrestricted operation without an energy saving mode, and, if no object has been determined by the radio location system, the control and evaluation unit is configured to set the spatially resolving sensor into restricted operation with an energy saving mode.

A large part of the energy consumption can be saved by the energy saving mode or by a safe standby function.

Additional alternative functions relate to a dynamic functional expansion of the spatially resolving sensors and a dynamic adaptation of safety levels.

The power consumption of complex spatially resolving sensors is typically in the range from 10-15 watts and adds up to around 100 kWh within a year. This energy consumption is comparable with a refrigerator. Since objects, vehicles, or machines, for example, are secured by a plurality of spatially resolving sensors, the energy consumption scales with the number of spatially resolving sensors used. This is problematic with respect to the achievable running times of the vehicles or machines and also with respect to the sustainability and the handling of resources.

This advantageously means that the local spatially resolving sensors or securing sensors change into an energy saving standby operation as long as no person or object is located in the closer environment.

The energy saving state of the local spatially resolving sensors is generally not produced by separating the voltage supply since it would take too long to reestablish the normal operating state. The shutdown or reduction of the illumination, the slowing down of the evaluation processors, the closing down of individual functional blocks, and/or the suspension of cyclic diagnostic functions.

In accordance with the further development, the energy consumption of spatially resolving sensors can be very greatly reduced in specific cases. The requirement is the combination of a safe radio location system and spatially resolving sensors or local securing sensors at objects, machines, and/or vehicles. The combination is effected with the aid of safe radio transponders that are anyway provided for a safe radio location system.

In a further development of the invention, the control and evaluation unit is configured to compare the position data of the radio location system and the information, e.g. status information, of the sensor and, on an agreement, to increase the safety level of the safety system and, on no agreement, to lower the safety level of the safety system.

The combination of independent and in particular diverse sensor information can be used to increase the safety level of a safety function in a targeted manner. The requirement of the combination of different sensor data is the merging in a common controller, namely the control and evaluation unit. In this specific case, the control and evaluation unit, for example a safe RTLS server, would additionally make use of the forwarded sensor information of the local spatially resolving sensors and use them alternately for the plausibilization in addition to the safe localization information.

In a further development of the invention, a first inspection unit is provided, with the first inspection unit being connected to the control and evaluation unit, and with the control and evaluation unit being checked by the first inspection unit).

The first inspection unit or a safe RTLS watchdog controller monitors the control and evaluation unit, with the first inspection unit, for example, validating the determined position data, transmitting switchover signals for a safety status of the individual radio transponders, or initiates inspection unit reset signals to the radio transponders in dependence on the situation, for example.

The first inspection unit and the control and evaluation unit thus form at least one single-channel system with testing in accordance with ISO 13849 or, optionally, a two-channel system. The first inspection unit provides the required diagnostic mechanisms such as are required, for example, by the relevant safety standards.

The first inspection unit or an RTLS watchdog controller serves for the monitoring and diagnosis of the safety system and of the control and evaluation unit and performs safety functions of the safety system. The first inspection unit uses the control and evaluation unit as a communication relay, for example. The first inspection unit, for example, specifically monitors the correct communication between the radio transponders, the radio stations, and the control and evaluation unit, checks the time behavior of all the components, and performs consistency checks on the data determined. The first inspection unit optionally also uses a functional block for this purpose that is performed in the control and evaluation unit or on the RTLS server.

The first inspection unit or the RTLS watchdog controller uses position data or checked position data of the RTLS system and, for example, information on hazard locations provided in advance by configuration, details of the operating environment, etc. to carry out an evaluation of the local hazards. This is done in the simplest case in that the distances between persons and hazard locations are determined and in that risk reducing measures are initiated on a falling below of a safety limit. A risk reduction is based, for example, on the inspection unit transmitting a safe shutdown or switchover signal to the radio transponders that they, for example, forward to a connected machine or, in the case of a radio transponder, forward a warning signal or action instructions to the person.

A plurality of radio transponders are provided, for example, at all spatially variable machines and persons and optionally also at stationary machines, for example.

The radio transponders can have additional tasks and therefore differ from the conventional radio transponders or tags. The following functions are included, for example, in addition to the localization function of the RTLS system:

Radio-based determination of one's own position; for example, an inverse radio location based on flashing light signals of the different radio stations.

Alternatively, a time of flight measurement of the radio station signals can take place by the radio transponder and a feedback of the time of flight differences to the first inspection unit or to the RTLS watchdog controller, according to which a validation of the calculated radio transponder positions takes place.

A transmission of position/status/diagnostic information for example, further takes place to the control and evaluation unit and to the first inspection unit.

To be able to perform these functions, the radio transponders have directional communication, for example, with the first inspection unit.

The first inspection unit checks the plausibility of the determined position data and transmits signals to switch over a safety status of the respective radio transponder on a recognition of errors or implausible measured values.

The RTLS system according to which position data of the radio transponder, and thus position data of the objects, can be determined by means of the radio location system determines the positions of all the radio transponders in a fixed time pattern using radio location. The RTLS system works with bidirectional communication between the radio transponders and the radio stations. The bidirectional communication is primarily required because the safe signal outputs of the radio transponders can be controlled by it. The radio transponders can additionally, for example, determine their positions themselves and transmit the result of the localization to the control and evaluation unit with the aid of a radio feedback channel, for example a UWB feedback channel. Two independently determined pieces of position information are thereby available for comparison in the control and evaluation unit or on the RTLS server. Namely, first, the position information determined by the radio stations and, second, the position information determined by the radio transponders. Alternatively, time of flight measurements of the signals transmitted by the radio stations can be carried out by the radio transponders and only the determined times of flight can be returned to the control and evaluation unit for validation. This is sufficient for the validation of the position determination. The bidirectional communication can additionally be used to forward diagnostic information or other status information locally determined on the transponders to the first inspection unit or to the watchdog controller.

In a further development of the invention, the radio transponders respectively have a second inspection unit. A failure of the radio transponders is checked by it.

The second inspection unit and the control and evaluation unit thus form at least one single-channel system with testing in accordance with ISO 13849 or, optionally, a two-channel system. The second inspection unit provides the required diagnostic mechanisms such as are required, for example, by the relevant safety standards.

In a further development of the invention, the control and evaluation unit is configured to compare the position data of the radio location system and the information, e.g. status information, of the spatially resolving sensor and, if no position data of the radio location system are available, the control and evaluation unit is configured to set the spatially resolving sensor into unrestricted operation with non-reduced detection capability.

The radio location system or the localization system is dependent on all the safety relevant objects and all the persons being provided with radio transponders. The loss or failure of radio transponders is monitored and would ultimately result in a safety directed shutdown of the system. Since this is a huge productivity reducing intervention, a fallback mode is provided in which a limited operation is still possible. Local sensor data and/or sensor functions can be made use of for this purpose. Examples are the transfer of the securing function to the local spatially resolving sensors or the sector-specific division of the operating environment into zones in which the radio location system or the safe localization system works and regions that are closed down or have to be locally monitored by the spatially resolving sensors. Information has to be present for this purpose that all the relevant persons and objects are still equipped with radio transponders in these sectors. The merging of local spatially resolving sensor information and higher ranking information of the radio location system is also required for this function.

In a further development of the invention, the radio transponders have identification, with a respective radio transponder being associated with a respective object, whereby the control and evaluation unit is configured to distinguish the objects For example, first objects are mobile objects and second objects are mobile objects, wherein the radio transponders have identification, wherein a respective radio transponder is associated with a mobile object, whereby the control and evaluation unit is configured to distinguish the mobile objects, and wherein the control and evaluation unit is configured to associate a risk classification with each mobile object at least in dependence on the position of one mobile object with respect to at least one other mobile object.

The mobile object or a movable machine or mobile machine can, for example, be a guideless vehicle, a driverless vehicle, an automated guided vehicle (AGV), an automatic mobile robot (AMR), an industrial mobile robot (IMR), or a robot having movable robot arms. The mobile machine thus has a drive and can be moved in different directions.

Furthermore, for example, first objects are persons and second objects are mobile objects, wherein the radio transponders have identification, wherein a respective radio transponder is associated with at least one person and a respective radio transponder is associated with at least one mobile object, whereby the control and evaluation unit is configured to distinguish the persons and mobile objects, and wherein the control and evaluation unit is configured to associate a risk classification with each person at least in dependence on the position of the person with respect to at least one mobile object.

In a further development of the invention, the radio transponders are configured to transmit safe control signals to the control and evaluation unit for an initiation of risk reduction measures.

A risk reduction measure can thus be triggered at the control and evaluation unit starting from the radio transponder and thus starting from the object. For example, starting from an object movement and thus starting from a movement of the radio transponder, a risk reduction measure can be initiated, namely, for example, a machine can be stopped, on the basis of a movement of the radio transponder in the direction of the hazardous movement of the machine.

In a further development of the invention, the control and evaluation unit is configured to transmit safe control signals for an initiation of risk reduction measures.

Starting from a recognized risk in the safety system, a risk reduction measure can thus be triggered in the radio transponder or in a plurality of or a large number of radio transponders. For example, starting from an object movement and thus starting from a movement of the radio transponder, a risk reduction measure can be initiated, namely, for example, a plurality of vehicles can be slowed or even stopped on the basis of a movement of the radio transponder of a person in the direction of the vehicle.

In a further development of the invention, the radio location system is an ultra wideband radio location system, with the frequency used being in the range from 3.1 GHz to 10.6 GHz, with the transmission energy per radio station amounting to a maximum of 0.5 mW.

An absolute bandwidth in an ultra wideband radio location system amounts to at least 500 MHz or a relative bandwidth amounts to at least 20% of the central frequency.

The range of such a radio location system amounts, for example, to 0 to 50 m. In this respect, the short time duration of the radio pulses is used for the localization.

The radio location system thus only transmits radio waves having a low energy. The system can be used very flexibly and has no interference.

A different radio technology could also be used for localization in addition to said UWB localization system.

The connection of the localization and communication function in the UWB system could also be divided over two separate systems. Provision is, for example, made that the UWB system only takes over the localization and an additional wireless LAN network is used for the data transfer.

The spatially resolving sensor is an optoelectronic sensor, for example.

With an optoelectronic sensor, for example a time of flight sensor, the light that is transmitted by a light transmitter and that is remitted by the person or object is received by a light receiver and the time of flight from the transmission up to the reception by the person or object is evaluated, whereby the distance from the person or object can be determined. This is a localization, namely for example the determination of distance and angle.

The spatially resolving sensor is, for example, an ultrasound sensor or a radar sensor.

An ultrasound sensor transmits ultrasound and evaluates the reflected sound waves, that is the echo signals. Frequencies from 16 kHz onward are used here. Detection ranges from a few centimeters to a number of meters can be implemented here.

A radar sensor is a sensor that transmits a so-called primary signal as a bundled electromagnetic wave that receives echoes reflected from persons or objects as a secondary signal and evaluates it according to different criteria. This is a localization, namely for example the determination of distance and angle.

Position information or the position can be acquired from the received waves reflected from the person or object. As already mentioned, the angle or the direction of the object and the distance from the person or object can be determined from the time shift between the transmission and reception of the signal. The relative movement between the transmitter and the person or object can furthermore also be determined, for example by a simple multiple measurement at time intervals. The arrangement of individual measurements after one another delivers the distance and the absolute speed of the object. Contours of the person or object can be recognized with a corresponding resolution of the radar sensor.

An irradiation from the radar sensor takes place, for example, largely bundled in one direction due to the antenna design. The radiation characteristics of the antenna then has a so-called lobe shape.

The wavelength of the radar is in the range of the radio waves in the short wave to microwave range. A pulse radar sensor transmits pulses having a typical duration in the lower microsecond range and then waits for echoes. The transit time of the pulse is the time between the transmission and the reception of the echoes. It is used for distance determination.

A direction of the scanning beam of a pulse radar sensor can also be effected, instead of by the alignment of the antenna or antennas, electronically by phase-controlled antenna arrays. A plurality of objects can be targeted and almost simultaneously tracked in a fast alternating manner by this.

The radar sensor works at a power of approximately 10 mW, for example. This power is so low that there are no health effects. The radar frequency licensed for this application is, for example, in the range from 76-77 GHz, corresponding to a wavelength of approximately 4 mm.

The spatially resolving sensor is, for example, configured for the at least areal monitoring of a monitored zone.

The spatially resolving sensor for the at least areal monitoring of a monitored zone is a sensor for distance measurement. The distance sensor delivers distance values in at least two-dimensional space. In so doing, the sensor outputs measured values with distance indications and angle indications. For example, the distance is determined by means of time of flight methods or triangulation methods.

The spatially resolving sensor is, for example, configured for the at least spatial monitoring of a monitored zone.

For example, the optoelectronic sensor is a laser scanner, a safety laser scanner, a 3D camera, a stereo camera, or a time of flight camera.

The spatially resolving scanner, the laser scanner, the safety laser scanner, the 3D camera, the stereo camera, or the time of flight camera monitors a two-dimensional or a three-dimensional monitored zone for the position detection. It can synonymously be a monitored field.

Safety systems used in safety engineering have to intrinsically work particularly reliably inherently safely and must therefore satisfy high safety demands, for example the standard EN13849 for safety of machinery and the machinery standard EN1496 for electrosensitive protective equipment (ESPE).

To satisfy these safety standards, a series of measures have to be taken such as a secure electronic evaluation by redundant and/or diverse electronics or different functional monitoring processes, especially the monitoring of the contamination of optical components, including a front lens. A safety laser scanner in accordance with such standards is known, for example, from DE 43 40 756 A1.

The term "functionally safe" is to be understood in the sense of the standards named or of comparable standards; measures are therefore taken to control errors up to a specified safety level. The safety system can therefore be configured as intrinsically safe. The safety system and/or at least one safe sensor moreover generate unsafe data such as raw data, point clouds, or the like. Unsafe is the opposite of safe for unsafe devices, transmission paths, evaluations, and the like and accordingly said demands on failsafeness are not satisfied.

A 3D camera, for example, likewise monitors a monitored zone by means of a plurality of detected distance values. A 3D camera has the advantage that a volume-like protected zone can be monitored.

A stereo camera, for example, likewise monitors a monitored zone by means of a plurality of detected distance values. The distance values are determined on the basis of the two camera of the stereo camera that are installed at a basic spacing from one another. A stereo camera equally has the advantage that a volume-like protected zone can be monitored.

Distance values on the basis of the measured time of flight that are determined by an image sensor are determined by means of a time of flight camera. A time of flight camera equally has the advantage that a volume-like or spatial protected zone can be monitored.

The invention will also be explained in the following with respect to further advantages and features with reference to the enclosed drawing and to embodiments. The Figures of the drawing show in.

In the following Figures, identical parts are provided with identical reference numerals.

Figure 1:
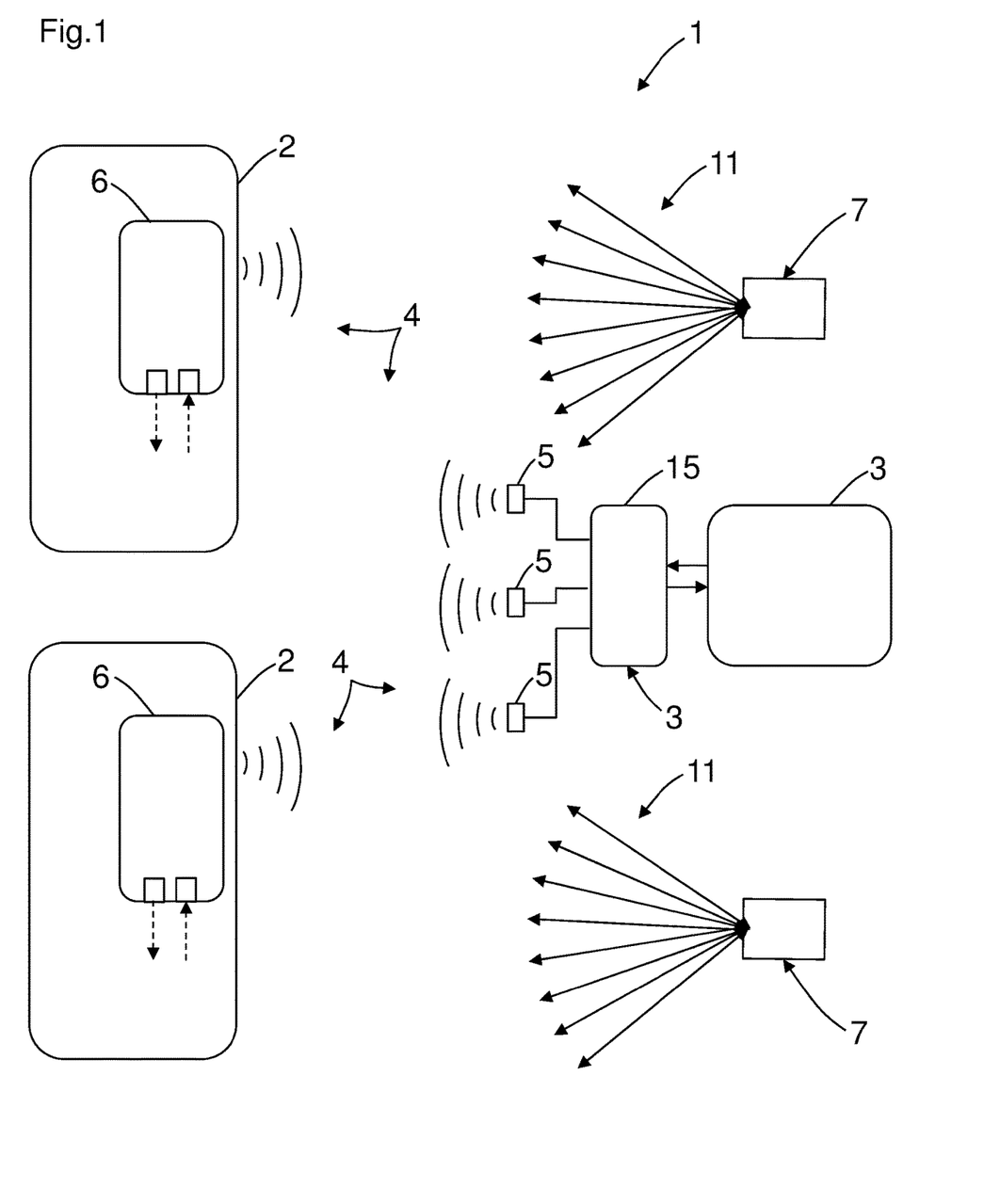
FIG. 1 to FIG. 3 respectively a safety system.

FIG. 1 shows a safety system 1 for the localization of at least one spatially variable object 2 having at least one control and evaluation unit 3, having at least one radio location system 4, having at least one spatially resolving sensor 7 for the detection of an object 2 in a detection zone 11 of the spatially resolving sensor 7, wherein the radio location system 4 has at least three arranged radio stations 5, wherein at least one radio transponder 6 is arranged at the object 2, wherein position data of the radio transponder 6 and thus position data of the object 2 can be determined by means of the radio location system 4, wherein the position data can be transmitted from the radio station 5 of the radio location system 4 to the control and evaluation unit 3, wherein the control and evaluation unit 3 is configured to cyclically detect the position data of the radio transponder 6 and information on the object 2 in the detection zone 11 can be determined by means of the spatially resolving sensor, wherein the information on the object 2 in the detection zone 11 can be transmitted from the spatially resolving sensor 7 to the control and evaluation unit 3, wherein the control and evaluation unit 3 is configured to evaluate the position data of the radio location system 4 and the information of the spatially resolving sensor 7, wherein bidirectional radio communication is provided between the radio stations 5 and the radio transponders 6, and wherein the radio transponders 6 each have safe signal outputs 10 and the radio transponders 6 each have safe signal inputs 9.

In accordance with the FIG. 1, the available sensor information of the spatially resolving sensors 7 is collected and is merged at a central point, that is the control and evaluation unit 3 or a central safety device or a so-called safety information hub.

The radio transponders 6 additionally have expanded radio communication, specifically the bidirectional radio communication with the radio stations 5, to be put into a position to forward safety relevant information of the object 2, for example of a vehicle and in particular connected local spatially resolving securing sensors 7, to the central control and evaluation unit 3 or to an RTSL server. For this purpose, the radio transponder 6 is not only integrated on the object 2, for example on the vehicle, in the shutdown path of the vehicle, for example via a safety controller, but the radio transponder 6 additionally has at least one safe signal input 9 by which the radio transponder 6 receives output information of the spatially resolving sensor 7.

The output information can in the simplest case, for example, be the safety status of protected fields 11, for example. In a further expansion stage, however, safe object lists, object positions, and optionally further compressed environmental information.

The object 2 can, for example, be a vehicle, an autonomous vehicle, a machine, a robot, a system part or machine part, or, for example, however, also a person.

The radio transponder 6 outputs a safe output signal, in particular, for example, to the vehicle, a machine or the object 2, via the safe signal output 10 or via a safety interface. The vehicle is, for example, thereupon braked, slowed, or even stopped. A machine can, for example, thereupon be slowed or likewise stopped.

An output of safety related signals to the object 2, the vehicle, and/or the machine takes place via the safe signal outputs 10 or via the safety interface.

The radio transponder 6 having the safe signal output 10 in particular allows the direct action on the object 2, the vehicle, or the machine and bypasses the necessity of initiating risk reduction measures via a higher ranking machine control.

The radio transponders 6 are thus additionally equipped with a safe signal output 10, for example, to the machine controller and indirectly to the spatially resolving safety sensor 7, in addition to the primary localization function, namely the transmission of regular brief radio signals to fixed position radio stations 5. In this way, a safe communication channel can be implemented between the spatially resolving sensors 7 or local securing sensors and the radio location system 4 or central localization system and further safety functions can be implemented at a central site. In this case, the central safety function can, for example, be a safe standby function for the spatially resolving sensors 7.

The radio stations 5 serve for the radio-based communication and the time of flight measurement with the spatially variable radio transponders 6 and for forwarding a communication and time of flight measured values to the control and evaluation unit 3 or to the RTLS server 15.

The control and evaluation unit 3 or a central RTLS server 15 receives the measured time of flight signals and determines position values of the radio transponders 6 present therefrom.

The localization of the radio transponders 6 takes place by time of flight measurements of radio signals that are cyclically exchanged between the radio transponders 6 and a plurality of fixed position radio stations 5.

For example, the control and evaluation unit 3 is configured to compare the position data of the radio location system 4 and the position e.g. status information, of the spatially resolving sensor 7 and, on an agreement, to permit the object 2 having the radio transponder 6 in a protected field 11 of the spatially resolving sensor 7 and not to output any object determination signal, whereby a, for example, movable machine is in an active state.

A dynamic muting is thus implemented by the safety system. The primary securing function of objects 2, for example vehicles or machines, is carried out by the local spatially resolving securing sensors 7.

If the position of an object 2 or of a person was able to be detected with the required technical safety reliability in the protected field 11, the classical safety function is bridged (muting) and a machine control can optionally make use of the position data of the object 2 or person for the situation based securing of the machine.

It is decisive in this process that the primary safety function remains muted for so long as the validation of the position data of the radio location system 4 and the information e.g. status information, of the spatially resolving sensor 7 is successful. This validation is carried out by the control and evaluation unit 3.

For example, when an object 2 is detected by the radio location system 4, the control and evaluation unit 3 is configured to set the spatially resolving sensor 7 into unrestricted operation with a non-reduced detection capability and, if no object 2 has been determined by the radio location system 4, the control and evaluation unit 3 is configured to set the spatially resolving sensor 7 into restricted operation with a reduced detection capability.

A safe standby function or a safe rest function is thus implemented. This function has the purpose of reducing the energy consumption of the spatially resolving sensor 7 and utilizes localization information of the radio location system 4 to set local spatially resolving safety sensors into an energy saving standby mode at times.

For example, when an object 2 is detected by the radio location system 4, the control and evaluation unit 3 is configured to set the spatially resolving sensor 7 into unrestricted operation without an energy saving mode, and, if no object 2 has been determined by the radio location system 4, the control and evaluation unit 3 is configured to set the spatially resolving sensor 7 into restricted operation with an energy saving mode. A large part of the energy consumption can be saved by the energy saving mode or by a safe standby function.

For example, the control and evaluation unit 3 is configured to compare the position data of the radio location system 4 and the information, e.g. status information, of the spatially resolving sensor 7 and, on an agreement, to increase the safety level of the safety system and, on no agreement, to lower the safety level of the safety system 1.

The combination of independent and in particular diverse sensor information can be used to increase the safety level of a safety function or of the safety system 1 in a targeted manner. The requirement of the combination of different sensor data is the merging in a common controller, namely the control and evaluation unit 3. In this specific case, the control and evaluation unit 3, for example a safe RTLS server 15, would additionally make use of the forwarded sensor information of the local spatially resolving sensors and use them alternately for the validation in addition to the safe localization information.

Figure 2:
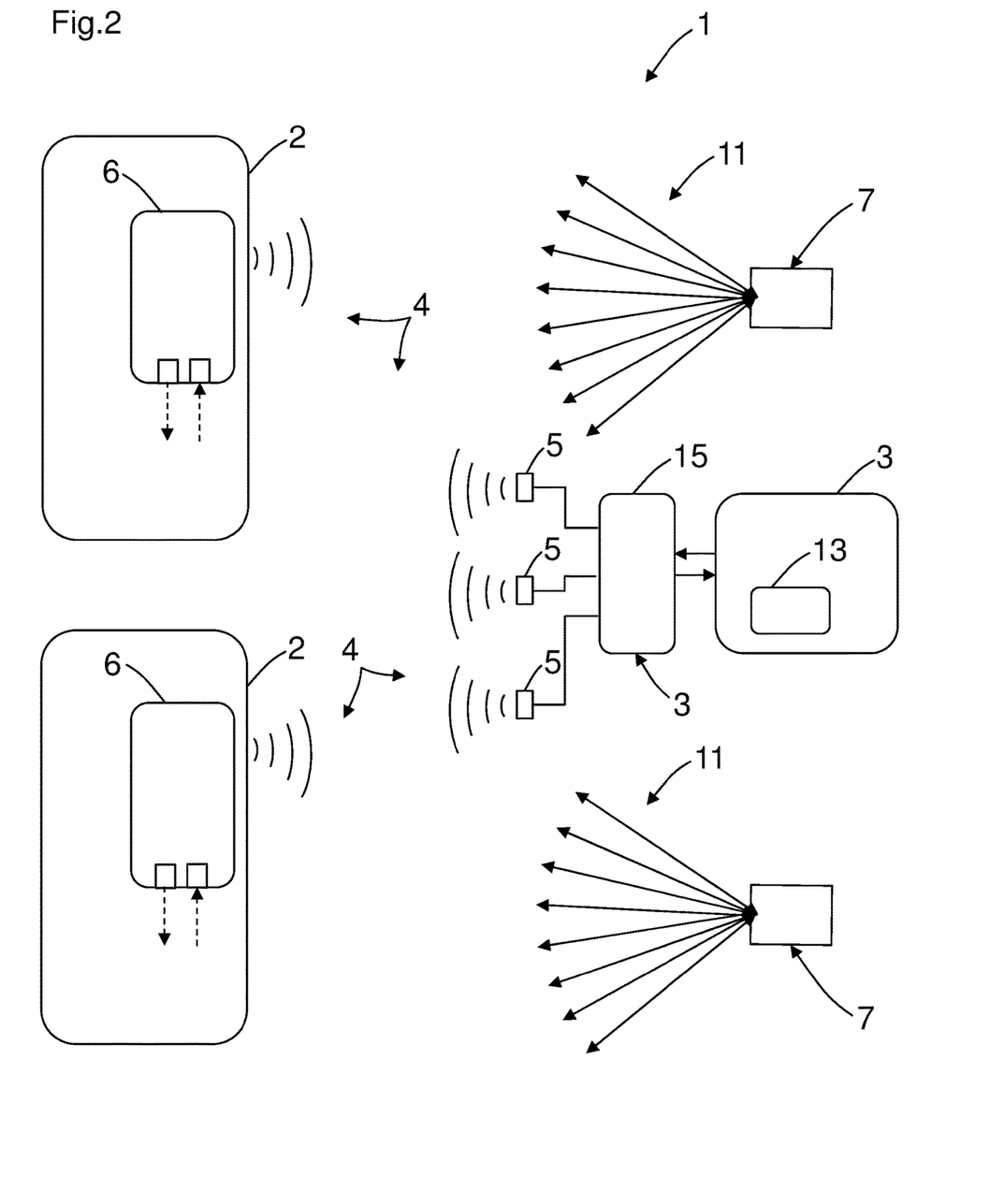

For example, in accordance with FIG. 2, a first inspection unit 13 is provided, with the first inspection unit 13 being connected to the control and evaluation unit 3, and with the control and evaluation unit 3 being checked by the first inspection unit 13.

The first inspection unit 13 or a safe RTLS watchdog controller monitors the control and evaluation unit 3, with the first inspection unit 13, for example, validating the determined position data, transmitting switchover signals for a safety status of the individual radio transponders 6, or initiating inspection unit reset signals to the radio transponders 6 in dependence on the situation, for example.

To be able to perform these functions, the radio transponders 6 have bidirectional communication, for example, with the first inspection unit 13.

The first inspection unit 13 checks the plausibility of the determined position data and transmits signals to switch over a safety status of the respective radio transponder 6 on a recognition of errors or implausible measured values.

Figure 3:
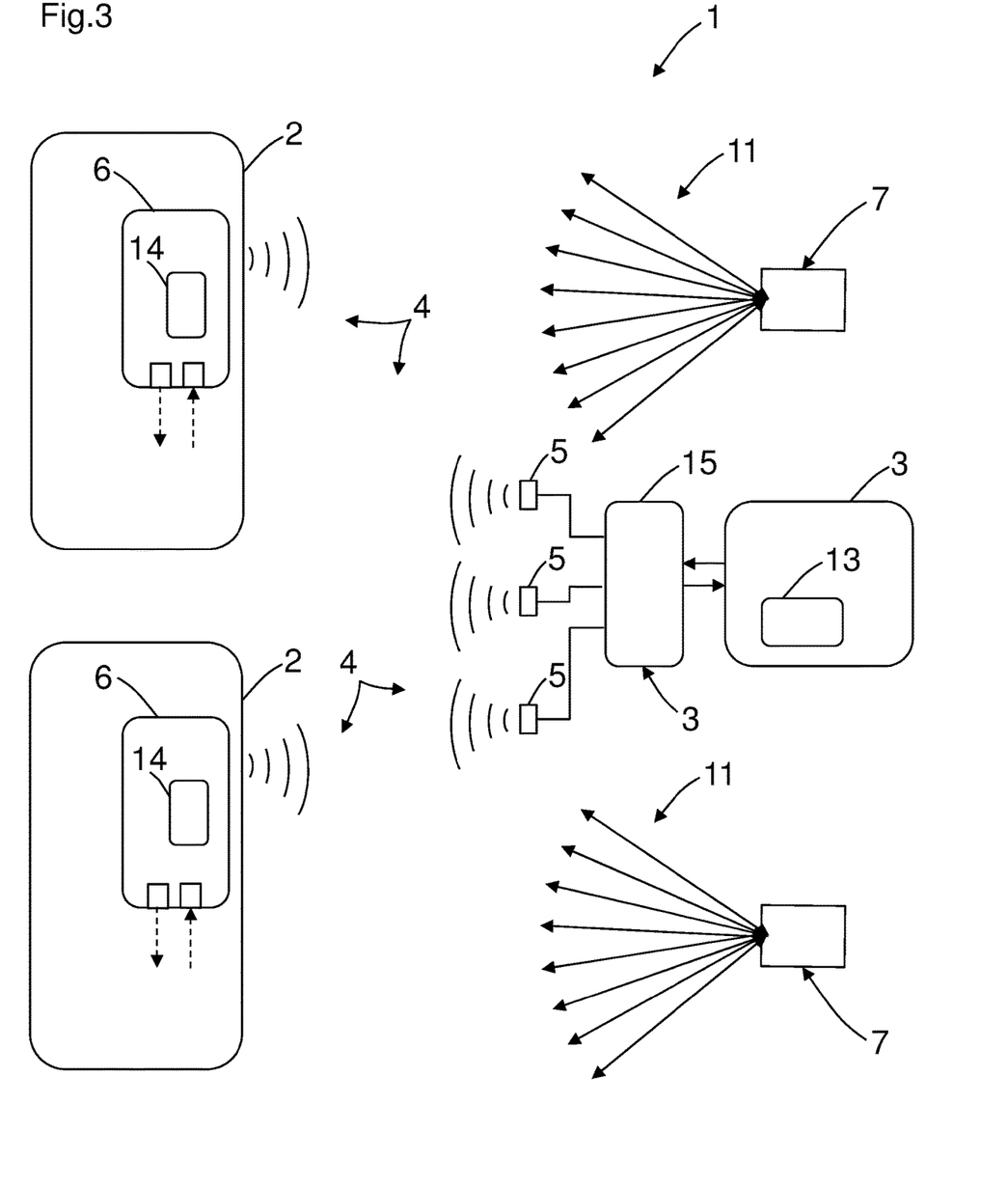

The radio transponders 6 in accordance with FIG. 3, for example, each have a second inspection unit 14. A failure of the radio transponders 6 is checked by it.

The second inspection unit 14 and the control and evaluation unit 6 thus form at least one single-channel system with testing in accordance with ISO 13849 or, optionally, a two-channel system. The second inspection unit 14 provides the required diagnostic mechanisms such as are required, for example, by the relevant safety standards.

For example, the control and evaluation unit 3 is configured to compare the position data of the radio location system 4 and the information, e.g. status information, of the spatially resolving sensor 7 and, if no position data of the radio location system 4 are available, the control and evaluation unit 3 is configured to set the spatially resolving sensor 7 into unrestricted operation with non-reduced detection capability.

The radio transponders 6, for example, have identification, with a respective radio transponder 6 being associated with a respective object 2, whereby the control and evaluation unit 3 is configured to better distinguish the objects 2.

For example, the radio transponders 6 are configured to transmit safe control signals to the control and evaluation unit 3 for an initiation of risk reduction measures.

A risk reduction measure can thus be triggered at the control and evaluation unit 3 starting from the radio transponder 6 and thus starting from the object 2. For example, starting from an object movement and thus starting from a movement of the radio transponder 6, a risk reduction measure can be initiated, namely, for example, a machine can be stopped, on the basis of a movement of the radio transponder 6 in the direction of the hazardous movement of the machine.

For example, the control and evaluation unit 3 is configured to transmit safe control signals for an initiation of risk reduction measures to the radio transponders 6.

Starting from a recognized risk in the safety system 1, a risk reduction measure can thus be triggered in the radio transponder 6 or in a plurality of or a large number of radio transponders 6. For example, starting from an object movement and thus starting from a movement of the radio transponder 6, a risk reduction measure can be initiated, namely, for example, a plurality of vehicles can be slowed or even stopped on the basis of a movement of the radio transponder of a person in the direction of the vehicle.

The radio location system 4, for example, is an ultra wideband radio location system, with the frequency used being in the range from 3.1 GHz to 10.6 GHz, with the transmission energy amounting to a maximum of 0.5 mW per radio station.

The spatially resolving sensor 7 is optionally an optoelectronic sensor.

With an optoelectronic sensor, for example a time of flight sensor, the light that is transmitted by a light transmitter and that is remitted by the person or object 2 is received by a light receiver and the time of flight from the transmission up to the reception by the person or object 2 is evaluated, whereby the distance from the person or object 2 can be determined. This is a localization, namely for example the determination of distance and angle.

The spatially resolving sensor 7 is, for example, an ultrasound sensor or a radar sensor.

The spatially resolving sensor 7 is, for example, configured for the at least areal monitoring of a monitored zone.

The spatially resolving sensor 7 for the at least areal monitoring of a monitored zone is, for example, a sensor for distance measurement. The distance sensor delivers distance values in at least two-dimensional space. In so doing, the sensor outputs measured values with distance indications and angle indications. For example, the distance is determined by means of time of flight methods or triangulation methods.

The spatially resolving sensor 7 is, for example, configured for the at least spatial monitoring of a monitored zone.

For example, the optoelectronic sensor is a laser scanner, a safety laser scanner, a 3D camera, a stereo camera, or a time of flight camera.

The spatially resolving scanner 7, the laser scanner, the safety laser scanner, the 3D camera, the stereo camera, or the time of flight camera monitors a two-dimensional or a three-dimensional monitored zone or a measured data contour for the position detection. It can synonymously be a monitored field.

A 3D camera, for example, likewise monitors a monitored zone by means of a plurality of detected distance values. A 3D camera has the advantage that a volume-like protected zone can be monitored.

A stereo camera, for example, likewise monitors a monitored zone by means of a plurality of detected distance values. The distance values are determined on the basis of the two camera of the stereo camera that are installed at a basic spacing from one another. A stereo camera equally has the advantage that a volume-like protected zone can be monitored.

Distance values on the basis of the measured time of flight that are determined by an image sensor are determined by means of a time of flight camera. A time of flight camera equally has the advantage that a volume-like or spatial protected zone can be monitored.

REFERENCE NUMERALS

1 safety system
2 object
3 control and evaluation unit
4 radio location system
5 radio stations
6 radio transponder
7 spatially resolving sensor
9 safe signal inputs
10 safe signal outputs
11 detection zone
13 first inspection unit
14 second inspection unit
15 RTLS server

The invention claimed is:

1. A safety system for localizing at least one spatially variable object,
   having at least one control and evaluation unit, and having at least one radio location system,
   having at least one spatially resolving sensor for the detection of at least one object in a detection zone of the spatially resolving sensor,
   wherein the radio location system has at least three arranged radio stations;
   wherein at least one radio transponder is arranged at the at least one object;
   wherein position data of the at least one radio transponder and thus position data of the at least one object is determined by means of the radio location system;
   wherein the position data is transmitted from the radio stations of the radio location system to the control and evaluation unit;
   wherein the control and evaluation unit is configured to cyclically detect the position data of the at least one radio transponder,
   and information on the at least one object in the detection zone is determined by means of the spatially resolving sensor;
   wherein the information on the at least one object is transmitted from the spatially resolving sensor to the control and evaluation unit;
   wherein the control and evaluation unit is configured to evaluate the position data of the radio location system and the information data of the spatially resolving sensor; and
   wherein bidirectional radio communication is provided between the radio stations and the at least one radio transponder,
   characterized in that each radio transponder, from among the at least one radio transponder, has safety signal outputs;
   and that each radio transponder, from among the at least one radio transponder, has safety signal inputs,
   wherein the control and evaluation unit is configured to compare the position data of the radio location system and the information of the spatially resolving sensor and, on an agreement, to permit the at least one object having the at least one radio transponder in a protected field of the spatially resolving sensor and not to output any object determination signal, whereby a movable machine is in an active state.

2. The safety system in accordance with claim 1, wherein if the at least one object is determined by the radio location system, the control and evaluation unit is configured to set the spatially resolving sensor into unrestricted operation with non-reduced detection capability;
   and if no object is determined by the radio location system, the control and evaluation unit is configured to set the spatially resolving sensor into restricted operation with reduced detection capability.

3. The safety system in accordance with claim 1, wherein if the at least one object is determined by the radio location system, the control and evaluation unit is configured to set the spatially resolving sensor into unrestricted operation without an energy saving mode;
   and if no object is determined by the radio location system, the control and evaluation unit is configured to set the spatially resolving sensor into restricted operation with an energy saving mode.

4. The safety system in accordance with claim 1, wherein the control and evaluation unit is configured to compare the position data of the radio location system and the information of the sensor and, on an agreement, to increase a safety level of the safety system and, on no agreement, to lower the safety level of the safety system.

5. The safety system in accordance with claim 1, wherein a first inspection unit is provided, with the first inspection unit being connected to the control and evaluation unit, and with the control and evaluation unit being checked by the first inspection unit.

6. The safety system in accordance with claim 1, wherein each radio transponder, from among the at least one radio transponder, has a second inspection unit.

7. The safety system in accordance with claim 1, wherein the control and evaluation unit is configured to compare the position data of the radio location system and the information of the spatially resolving sensor and, if no position data of the radio location system are available, the control and evaluation unit is configured to set the spatially resolving sensor into unrestricted operation with non-reduced detection capability.

8. The safety system in accordance with claim 1, wherein each radio transponder, from among the at least one radio transponder, has identification, with each said radio transponder being associated with a respective object, whereby the control and evaluation unit is configured to distinguish the objects.

9. The safety system in accordance with claim 1, wherein each radio transponder, from among the at least one radio transponder, is configured to transmit safety control signals for an initiation of risk reduction measures to the control and evaluation unit.

10. The safety system in accordance with claim 1, wherein the control and evaluation unit is configured to transmit safety control signals for an introduction of risk reduction measures to the at least one radio transponder.

11. The safety system in accordance with claim 1, wherein the radio location system is an ultra-wideband radio location system, with the frequency used being in the range from 3.1 GHz to 10.6 GHz, with the transmission energy amounting to a maximum of 0.5 mW.

12. A method using a safety system for localizing at least one spatially variable object, having at least one control and evaluation unit, and having at least one radio location system,
having at least one spatially resolving sensor for the detection of at least one object in a detection zone of the spatially resolving sensor,
wherein the radio location system has at least three arranged radio stations;
wherein at least one radio transponder is arranged at the object;
wherein position data of the at least one radio transponder and thus position data of the object are determined by means of the radio location system;
wherein the position data are transmitted from the radio stations of the radio location system to the control and evaluation unit,
wherein the control and evaluation unit cyclically detects the position data of the at least one radio transponder,
and information on the object in the detection zone is determined by means of the spatially resolving sensor;
wherein the information on the object in the detection zone is transmitted from the spatially resolving sensor to the control and evaluation unit;
wherein the control and evaluation unit evaluates the position data of the radio location system and the information of the spatially resolving sensor; and
wherein bidirectional radio communication is provided between the radio stations and the at least one radio transponder,
characterized in that each radio transponder, from the at least one radio transponder, has safety signal outputs;
and that each radio transponder, from the at least one radio transponder, has safety signal inputs,
wherein the control and evaluation unit is configured to compare the position data of the radio location system and the information of the spatially resolving sensor and, on an agreement, to permit the at least one object having the at least one radio transponder in a protected field of the spatially resolving sensor and not to output any object determination signal, whereby a movable machine is in an active state.

13. A safety system for localizing at least one spatially variable object, having at least one control and evaluation unit, and having at least one radio location system,
having at least one spatially resolving sensor for the detection of at least one object in a detection zone of the spatially resolving sensor,
wherein the radio location system has at least three arranged radio stations;
wherein at least one radio transponder is arranged at the at least one object;
wherein position data of the at least one radio transponder and thus position data of the at least one object is determined by means of the radio location system;
wherein the position data is transmitted from the radio stations of the radio location system to the control and evaluation unit;
wherein the control and evaluation unit is configured to cyclically detect the position data of the at least one radio transponder,
and information on the at least one object in the detection zone is determined by means of the spatially resolving sensor;
wherein the information on the at least one object is transmitted from the spatially resolving sensor to the control and evaluation unit;
wherein the control and evaluation unit is configured to evaluate the position data of the radio location system and the information data of the spatially resolving sensor; and
wherein bidirectional radio communication is provided between the radio stations and the at least one radio transponder,
characterized in that each radio transponder, from among the at least one radio transponder, has safety signal outputs;
and that each radio transponder, from among the at least one radio transponder, has safety signal inputs,
wherein the control and evaluation unit is configured to compare the position data of the radio location system and the information of the sensor and, on an agreement, to increase a safety level of the safety system and, on no agreement, to lower the safety level of the safety system.

14. A safety system for localizing at least one spatially variable object, having at least one control and evaluation unit, and having at least one radio location system,
having at least one spatially resolving sensor for the detection of at least one object in a detection zone of the spatially resolving sensor,
wherein the radio location system has at least three arranged radio stations;

wherein at least one radio transponder is arranged at the at least one object;
wherein position data of the at least one radio transponder and thus position data of the at least one object is determined by means of the radio location system;
wherein the position data is transmitted from the radio stations of the radio location system to the control and evaluation unit;
wherein the control and evaluation unit is configured to cyclically detect the position data of the at least one radio transponder,
and information on the at least one object in the detection zone is determined by means of the spatially resolving sensor;
wherein the information on the at least one object is transmitted from the spatially resolving sensor to the control and evaluation unit;
wherein the control and evaluation unit is configured to evaluate the position data of the radio location system and the information data of the spatially resolving sensor; and
wherein bidirectional radio communication is provided between the radio stations and the at least one radio transponder,
characterized in that each radio transponder, from among the at least one radio transponder, has safety signal outputs;
and that each radio transponder, from among the at least one radio transponder, has safety signal inputs,
wherein the control and evaluation unit is configured to compare the position data of the radio location system and the information of the spatially resolving sensor and, if no position data of the radio location system are available, the control and evaluation unit is configured to set the spatially resolving sensor into unrestricted operation with non-reduced detection capability.

15. A method using a safety system for localizing at least one spatially variable object, having at least one control and evaluation unit, and having at least one radio location system,
having at least one spatially resolving sensor for the detection of at least one object in a detection zone of the spatially resolving sensor,
wherein the radio location system has at least three arranged radio stations;
wherein at least one radio transponder is arranged at the object;
wherein position data of the at least one radio transponder and thus position data of the object are determined by means of the radio location system;
wherein the position data are transmitted from the radio stations of the radio location system to the control and evaluation unit,
wherein the control and evaluation unit cyclically detects the position data of the at least one radio transponder,
and information on the object in the detection zone is determined by means of the spatially resolving sensor;
wherein the information on the object in the detection zone is transmitted from the spatially resolving sensor to the control and evaluation unit;
wherein the control and evaluation unit evaluates the position data of the radio location system and the information of the spatially resolving sensor; and
wherein bidirectional radio communication is provided between the radio stations and the at least one radio transponder,
characterized in that each radio transponder, from the at least one radio transponder, has safety signal outputs;
and that each radio transponder, from the at least one radio transponder, has safety signal inputs,
wherein the control and evaluation unit is configured to compare the position data of the radio location system and the information of the sensor and, on an agreement, to increase a safety level of the safety system and, on no agreement, to lower the safety level of the safety system.

16. A method using a safety system for localizing at least one spatially variable object, having at least one control and evaluation unit, and having at least one radio location system,
having at least one spatially resolving sensor for the detection of at least one object in a detection zone of the spatially resolving sensor,
wherein the radio location system has at least three arranged radio stations;
wherein at least one radio transponder is arranged at the object;
wherein position data of the at least one radio transponder and thus position data of the object are determined by means of the radio location system;
wherein the position data are transmitted from the radio stations of the radio location system to the control and evaluation unit,
wherein the control and evaluation unit cyclically detects the position data of the at least one radio transponder,
and information on the object in the detection zone is determined by means of the spatially resolving sensor;
wherein the information on the object in the detection zone is transmitted from the spatially resolving sensor to the control and evaluation unit;
wherein the control and evaluation unit evaluates the position data of the radio location system and the information of the spatially resolving sensor; and
wherein bidirectional radio communication is provided between the radio stations and the at least one radio transponder,
characterized in that each radio transponder, from the at least one radio transponder, has safety signal outputs;
and that each radio transponder, from the at least one radio transponder, has safety signal inputs,
wherein the control and evaluation unit is configured to compare the position data of the radio location system and the information of the spatially resolving sensor and, if no position data of the radio location system are available, the control and evaluation unit is configured to set the spatially resolving sensor into unrestricted operation with non-reduced detection capability.

* * * * *